(12) United States Patent
Wan (10) Patent No.: US 9,843,755 B2
(45) Date of Patent: *Dec. 12, 2017

(54) IMAGE SENSOR HAVING AN EXTENDED DYNAMIC RANGE UPPER LIMIT

(71) Applicant: Google Inc., Mountain View, CA (US)

(72) Inventor: Chung Chun Wan, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/437,347

(22) Filed: Feb. 20, 2017

(65) Prior Publication Data

US 2017/0163924 A1  Jun. 8, 2017

Related U.S. Application Data

(63) Continuation of application No. 14/579,940, filed on Dec. 22, 2014, now Pat. No. 9,591,247.

(51) Int. Cl.
| | | |
|---|---|---|
| H04N 5/376 | (2011.01) | |
| H04N 5/378 | (2011.01) | |
| H04N 9/04 | (2006.01) | |
| G01J 1/46 | (2006.01) | |
| H04N 5/225 | (2006.01) | |
| G01J 1/44 | (2006.01) | |

(52) U.S. Cl.
CPC ............ *H04N 5/3765* (2013.01); *G01J 1/46* (2013.01); *H04N 5/378* (2013.01); *H04N 9/045* (2013.01); *G01J 2001/446* (2013.01); *H04N 5/2256* (2013.01)

(58) Field of Classification Search
None
See application file for complete search history.

(56) References Cited

U.S. PATENT DOCUMENTS

| | | |
|---|---|---|
| 6,069,377 A | 5/2000 | Prentice et al. |
| 6,765,619 B1 | 7/2004 | Deng |
| 6,977,685 B1 | 12/2005 | Acosta-Serafini et al. |
| 7,126,512 B2 | 10/2006 | Murphy |
| 7,274,393 B2 | 9/2007 | Acharya |
| 7,375,803 B1 | 5/2008 | Bamji |
| 7,420,154 B2 | 9/2008 | Shah |
| 7,936,038 B2 | 5/2011 | Jeong et al. |
| 7,990,636 B2 | 8/2011 | Park et al. |
| 8,027,107 B2 | 9/2011 | Hwang et al. |

(Continued)

FOREIGN PATENT DOCUMENTS

| | | |
|---|---|---|
| KR | 20140110986 A | 9/2014 |
| WO | WO 2013104718 A2 | 7/2013 |

OTHER PUBLICATIONS

PCT/US2015/061026—International Search Report & Written Opinion, dated Apr. 22, 2016, 11 pages.

*Primary Examiner* — Timothy J Henn
(74) *Attorney, Agent, or Firm* — Fish & Richardson P.C.

(57) ABSTRACT

An apparatus is described that includes an image sensor having timing and control circuitry and threshold circuitry. The timing and control circuitry is to generate signals to cause multiple transfers of charge from a photo-diode to a storage capacitor within a pixel cell during an image capture sequence. The threshold circuitry is to track the storage capacitor's voltage over the course of the multiple transfers and recognize when the storage capacitor's voltage reaches a threshold.

17 Claims, 8 Drawing Sheets

(56) References Cited

U.S. PATENT DOCUMENTS

| | | | |
|---|---|---|---|
| 8,116,018 B2 | 2/2012 | Park et al. | |
| 8,120,606 B2 | 2/2012 | Nakamura et al. | |
| 8,139,142 B2 | 3/2012 | Bamji et al. | |
| 8,159,762 B2 | 4/2012 | Lim et al. | |
| 8,218,016 B2 | 7/2012 | Park et al. | |
| 8,542,348 B2 | 9/2013 | Hardegger et al. | |
| 8,587,773 B2 | 11/2013 | Bamki et al. | |
| 8,633,431 B2 | 1/2014 | Kim | |
| 9,591,247 B2 * | 3/2017 | Wan | H04N 5/3765 |
| 2003/0063185 A1 | 4/2003 | Bell | |
| 2006/0284054 A1 | 12/2006 | Asaba | |
| 2008/0055441 A1 | 3/2008 | Altice | |
| 2009/0261235 A1 | 10/2009 | Lahav | |
| 2011/0013055 A1 | 1/2011 | Sul et al. | |
| 2011/0013064 A1 | 1/2011 | Lahav | |
| 2011/0032405 A1 | 2/2011 | Nozaki et al. | |
| 2011/0194007 A1 | 8/2011 | Kim et al. | |
| 2013/0026859 A1 | 1/2013 | Bae et al. | |
| 2013/0134470 A1 | 5/2013 | Shin et al. | |
| 2014/0078336 A1 | 3/2014 | Beck et al. | |
| 2015/0144790 A1 | 5/2015 | Velichko | |

* cited by examiner

IMAGE SENSOR HAVING AN EXTENDED DYNAMIC RANGE UPPER LIMIT

RELATED CASES

This application is a continuation of and claims the benefit of U.S. patent application Ser. No. 14/579,940, titled "AN IMAGE SENSOR HAVING AN EXTENDED DYNAMIC RANGE UPPER LIMIT", filed Dec. 22, 2014, which is incorporated by reference in its entirety.

FIELD OF INVENTION

The field of invention pertains generally to imaging technology, and, more importantly, to an image sensor having an extended dynamic range upper limit

BACKGROUND

Figure 1:
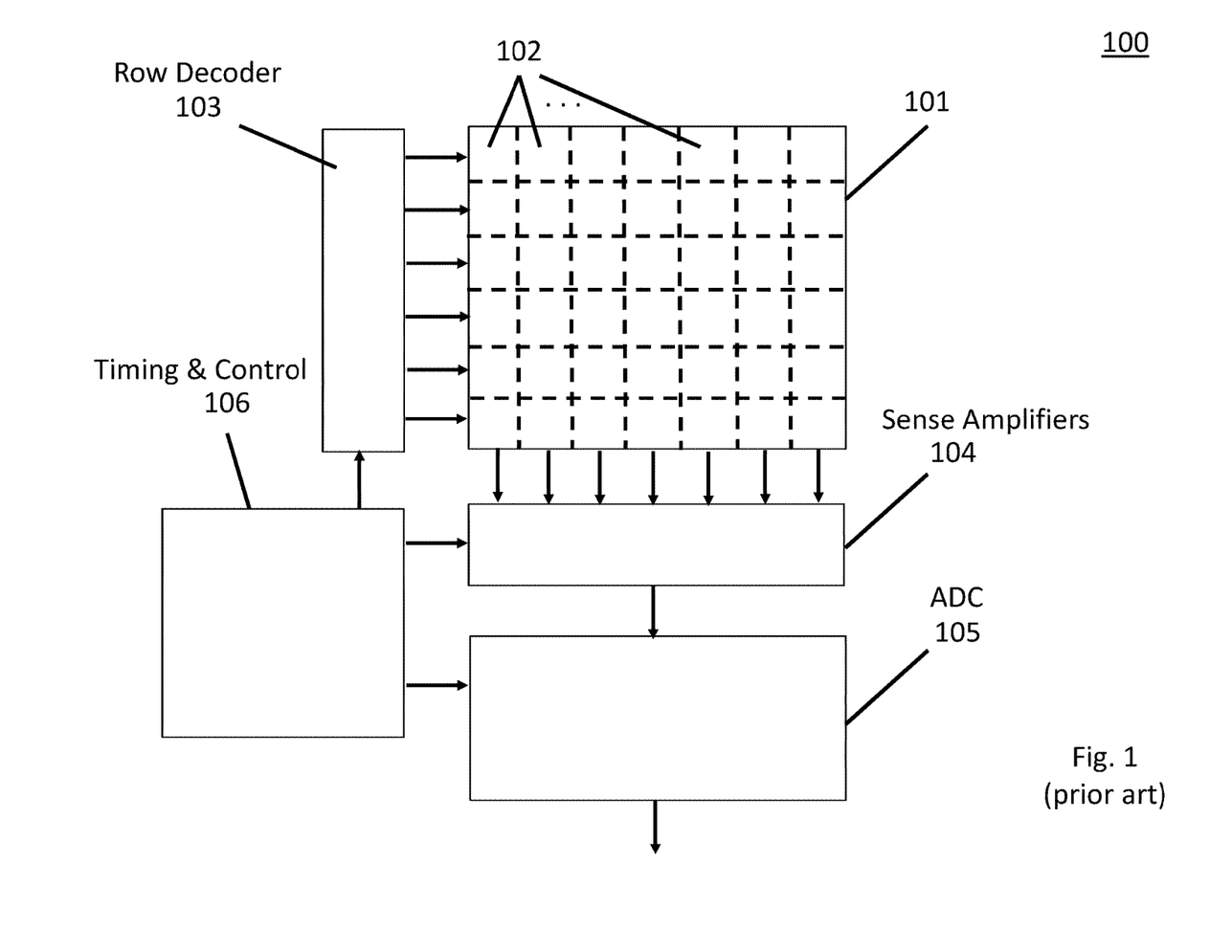
FIG. 1 shows a depiction of an image sensor (prior art)

FIG. 1 shows the basic elements of an image sensor 100. As observed in FIG. 1, the image sensor includes a pixel array 101 having constituent pixel cells 102. Coupled to the pixel array 101 is a row decoder 103 having outputs that couple to rows of pixel cells 102. Sense amplifiers 104 are also coupled to the pixel array 101 signal outputs. The image sensor 100 also includes analog-to-digital circuitry 105 coupled downstream from the sense amplifiers 103. The image sensor 100 also includes timing and control circuitry 106 that is responsible for generating clock and control signals that dictate the operation of the image sensor 100.

FIGURES

The following description and accompanying drawings are used to illustrate embodiments of the invention. In the drawings.

DETAILED DESCRIPTION

Figure 2:
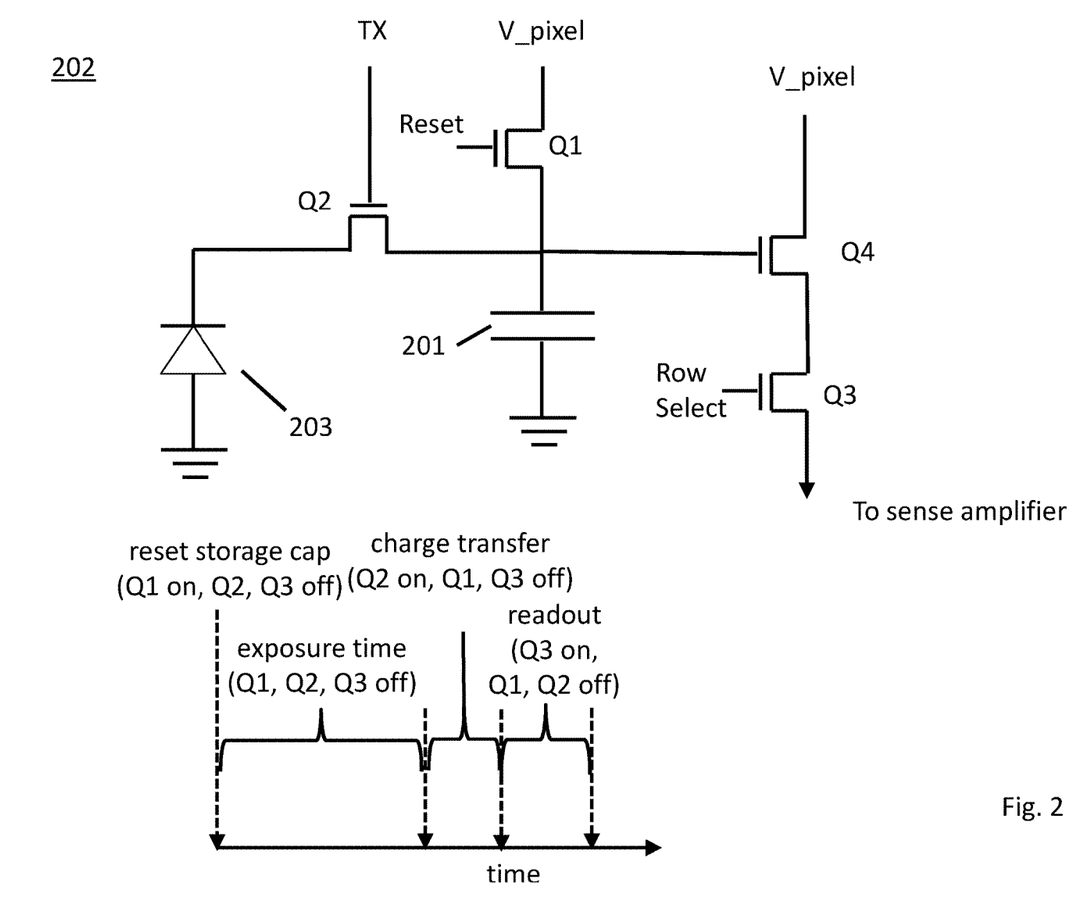
FIG. 2 shows a depiction of a visible light pixel cell.

FIG. 2 shows a pixel cell 202 for a visible light pixel. As observed in FIG. 2, initially, a capacitor 201 is cleared of its negative charge by turning on a reset transistor Q1. When the capacitor's negative charge is cleared and a transfer gate transistor Q2 is turned off, an exposure time begins in which a light sensitive photodiode 203 generates and collects negative charge (electrons) as a function of the intensity of the light that it receives over the exposure time and the length of the exposure time.

After the exposure time, the transfer gate transistor Q2 is turned on which transfers the negative charge that was collected in the photodiode 203 to the capacitor 201. The transfer of the negative charge into the capacitor 201 affects the voltage of the capacitor (the more negative charge the capacitor receives 201 the lower its voltage). After the photodiode's negative charge has been transferred to the capacitor 201, a row select control signal is enabled that turns on a row select transistor Q3 which permits a sense amplifier to sense the capacitor voltage. The reading of the capacitor's voltage is then digitized and used as an indication of the intensity of the light received by the photodiode 203. The process then repeats.

Typically, the row select signal turns on the row select transistor of every pixel cell along a same row in the pixel array. The row select signal "scrolls" through the rows of the array to receive the entire array image. In the case of a "global shutter" mode, the exposure times are simultaneous across all pixel cells in the array (and the image should not have any motion relation artifacts). In the case of a "rolling shutter" mode, the exposure times of the pixel cells are staged, e.g., on a row by row basis (which can permit the existence of motion artifacts).

The existence of the storage capacitor 201 permits the timing of the exposure to be decoupled from the timing of the row select activation and storage capacitor 201 readout. Said another way, after an exposure and the transfer of charge into the storage capacitor, the storage capacitor's voltage can remain for awhile before being read out. As a consequence, an image sensor architecture that supports multiple exposure times per storage capacitor readout are possible. That is, as just one example, an image sensor may be constructed that has three exposures with three corresponding transfers of charge into the storage capacitor 201 for every readout of the storage capacitor 201 in accordance with its row select activation.

Figure 3:
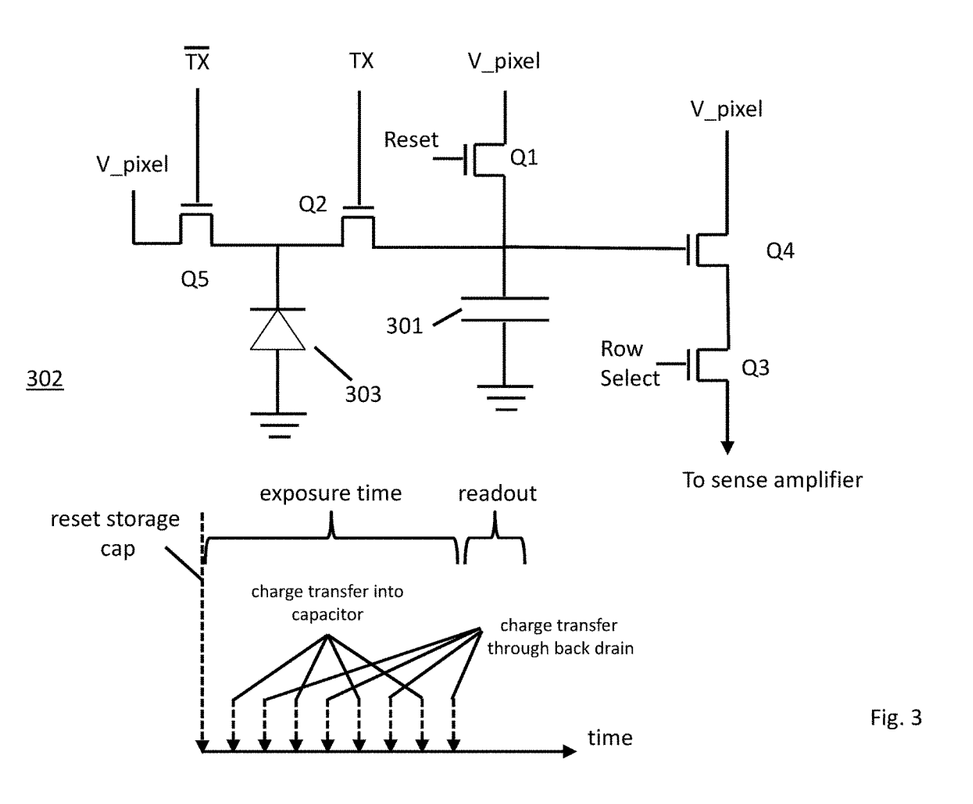
FIG. 3 shows a depiction of a Z pixel cell.

FIG. 3 shows a "Z" pixel array cell 302 for image sensors that capture depth information using "time-of-flight" techniques. In the case of time-of-flight image capture, a light source emits light from a camera system onto an object and measures, for each of multiple pixel cells of a pixel array, the time between the emission of the light and the reception of its reflected image upon the pixel array. The image produced by the time of flight pixels corresponds to a three-dimensional profile of the object as characterized by a unique depth measurement (z) at each of the different (x,y) pixel locations.

As observed in FIG. 3, the Z pixel array cell 302 includes a storage capacitor 301, reset transistor Q1, transfer gate transistor Q2, photodiode 303 and row select transistor Q3 that operate similarly as described above with respect to the visible light pixel cell 202. The transfer gate transistor Q2 is turned on-and-off during the exposure time with a clock signal over the course of the exposure. Controlling the transfer gate transistor Q2 with a clock signal during the exposure time of the Z pixel array cell 301 is an artifact of the time of flight technique. In a common approach, the same Z pixel array cell 302 is provided with four different clocks (each separated in phase by 90°) over four different reset, exposure time and readout sequences. The four different charge collection readouts are then combined to calculate the time-of-flight value for the pixel.

During the exposure time itself, as mentioned above, the transfer gate transistor Q2 toggles on-and-off. As such, charge is transferred from the photodiode 303 to the storage capacitor 301 multiples times during the exposure sequence. During the half clock cycles when the transfer gate transistor Q2 is off, a "back-drain" transistor Q5 is on to accept the charge from the photodiode 303. The clock that controls the transfer gate transistor Q2 is 180° out-of-phase with the clock that controls the back-drain transistor Q5 so that while one is on, the other is off.

As such, charge flow out of the photo-diode alternates direction back-and-forth between flowing through the transfer gate transistor Q2 and flowing through the back-drain transistor Q4 over the course of the exposure time. Note however, that turning the transfer gate transistor Q2 on and off during the exposure time of the Z pixel cell is functionally similar to the particular visible pixel cell embodiment mentioned just above in which there are multiple exposures and corresponding charge transfers into the storage capacitor 201 per row select readout.

Some image sensors, referred to as RGBZ image sensors, have a pixel array whose pixel array cells include both visible light pixel cell circuitry and Z pixel cell circuitry.

A problem with either pixel cell design is dynamic range. Dynamic range is a measure of how accurately the pixel cell can measure optical intensity at both stronger and weaker incident optical intensities. A problem with the visible light and Z pixel cell designs of FIGS. 2 and 3 is that at stronger optical intensities the charge that is generated in the photodiode 203, 303 and transferred to the storage capacitor 201, 301 can overwhelm/saturate the storage capacity of the storage capacitor 201, 301. When the storage capacitor 201, 301 is saturated it is essentially incapable of providing any more information about the intensity of the optical signal and corresponds to an upper limit on the dynamic range of the pixel cell.

A solution to the problem is to "sneak" a readout of the storage capacitor in between the formal row select voltage sense readouts of the storage capacitor. From such sneak readout(s), the amount of charge being stored in the capacitor can be monitored and, if the amount of charge indicates that the capacitor will saturate before its formal row select readout is to occur, the exposure and/or readout scheme for the cell's row can be tweaked in some fashion to prevent or otherwise avoid saturation of the capacitor.

As will be described in more detail below, it is pertinent to point out that the voltage sense amplifier that senses the voltage on the capacitor typically has very large input resistance and therefore accepts little or no charge/current from the storage capacitor when sensing the storage capacitor's voltage. As such, little or no charge is drawn from the storage capacitor when sensing its voltage. Generally, the aforementioned reset transistor is responsible for actually clearing the storage capacitor of its accumulated charge.

Figure 4:
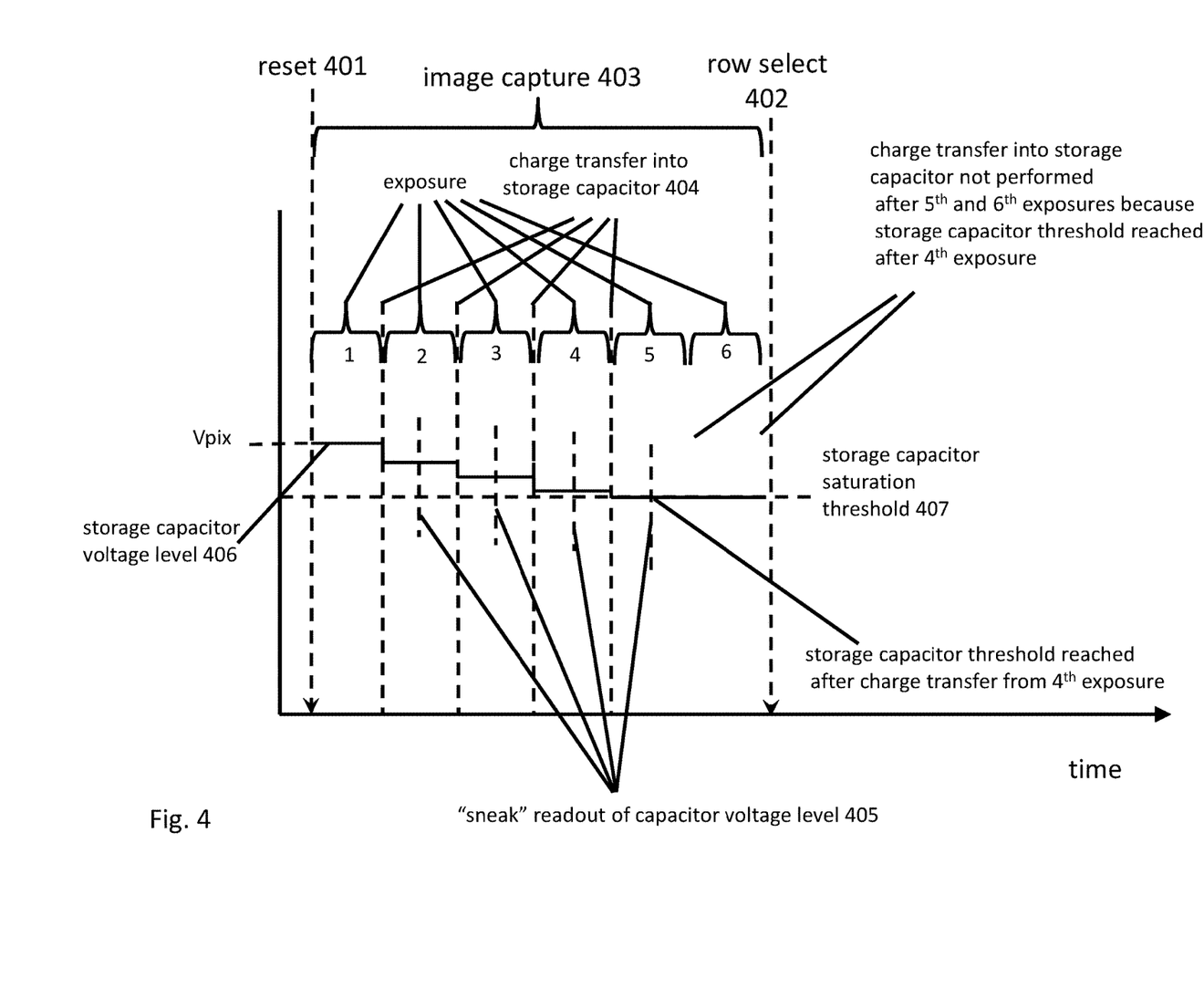
FIG. 4 shows a depiction of the operation of an image sensor having an extended upper limit on its dynamic range.

FIG. 4 shows timing diagrams for an embodiment of a image sensor that tracks the voltage on the storage capacitor during the taking of a single image. As observed in FIG. 4, according to the timing and operation of the pixel cell, charge is transferred into the storage capacitor from the photodetector at multiple, different instances 404 before a formal row select readout 402 of the cell is made.

Recall that a visible pixel cell storage capacitor may receive charge in this manner by having multiple exposures and charge transfers per row select readout 402, and, that a Z pixel cell storage capacitor receives charge in this manner over the course of normal pixel cell operation. The formal row select readout 402 essentially delimits or marks the taking of an image 403. That is, typically, the taking of an image 403 corresponds to whatever exposures and/or storage capacity activity occurs between a row reset 401 and a row select readouts 402.

As observed in the embodiment of FIG. 4, "sneak" readouts 405 of the storage capacitor's voltage level 406 are made after every transfer of charge 404 from the photodiode to the storage capacitor. At each readout, the voltage level 406 of the capacitor is compared against a threshold 407 that indicates the storage capacitor is at, or near, or approaching a saturation point. Note that the capacitor voltage level decreases as it accumulates charge because the charge is accumulated in the form of negative electrons.

If the voltage level 405 reaches or exceeds the threshold 407, the transfer gate transistor Q2 for the pixel cell is deactivated for the remainder of the image capture sequence 403 for the current image. In the case of a visible light pixel, for example, the optical intensity value for the pixel may be determined by extrapolating the charge level in view of the amount of exposure that remains for the current image sequence. For example, as observed in the exemplary embodiment of FIG. 4, there are six exposures and charge transfers per image capture 403. The capacitor voltage is observed to reach the threshold level 407 after the fourth exposure. As such, the optical intensity can be calculated as being 50% higher than what the saturated storage capacitor corresponds to (i.e., a hypothetical capacitor having infinite depth (no saturation level) could have received 50% more charge than the actual saturated capacitor).

In the case of a time of flight measurement, detecting the moment when the capacitor saturated ("which" sneak readout the threshold was reached) can be used to calculate reliable time-of-flight information. Here, as mentioned above, a time of flight measurement typically measures an amount of charge received at a pixel over four different phases (0°, 90°, 180°, 270°). The relative amount of charge that was generated in the pixel over the four different phased exposures is essentially reproduced into a time-of-flight value. In traditional time-of-flight systems saturation would essentially correspond to a loss of the ability to measure the relative amount of charge across the four different phases. By contrast, by detecting when the capacitor's threshold was reached, the amount of charge being generated at the pixel is still detectable across all four phase signals (higher intensities will reach saturation sooner than lower intensities). As such, a reliable time-of-flight value can still be calculated.

Although the embodiment of FIG. 4 shows the existence of a sneak readout 405 after every transfer of charge from a photodiode to an unsaturated storage capacitor, other embodiments may use different schemes (e.g., performing a sneak readout after every other transfer of charge into an unsaturated storage capacitor).

Note that the sneak readouts 405 may be made no differently than the formal row select readout 402 (e.g., by activating the row select transistor Q3). Here, in an embodiment, the difference between a formal row select readout 402 and a sneak readout 405 is that the formal row select readout 402 formally ends the capture sequence for the current image 403 whereas the sneak readouts 405 are made within the capture sequence for the current image 403.

In various embodiments, note that the manner in which the charge that has been transferred into the storage capacitor is measured can be made as a standard voltage measurement with, e.g., a voltage sense amplifier. Here, according to typical operation, the transfer of charge from a photodiode into the storage capacitor corresponds to the transfer of electrons from the photodiode into the storage capacitor. As such, in many designs increased charge from the photodiode is measured as lowered storage capacitor voltage (because electrons are negatively charged). Regardless, the level of the capacitor voltage essentially corresponds to the amount of charge that the capacitor has received from the photodiode. The sense amplifiers measure the capacitor voltage. Follow on analog-to-digital (ADC) circuitry then digitizes the measured analog voltage level.

Logic circuitry behind the ADC circuitry and/or analog circuitry coupled to the sense amplifiers compares the capacitor voltage level 406 against the threshold 407 and triggers the "shutdown" of the pixel cell if the threshold 407 is reached.

In an embodiment, each pixel cell in the array is tied to the same transfer gate control signal. As such, shutting down the pixel cell by deactivating its transfer gate signal will cause all pixel cells along the pixel cell's row to also be shutdown. In an alternate embodiment, the transfer gate signal for individual pixel cells can be individually deactivated without affecting the active status of the pixel cells along the same row as the deactivated pixel cell (e.g., by driving a unique transfer gate signal individually to each pixel cell rather than tying the transfer gate signal of all pixel cells along a same row together).

Figure 5:
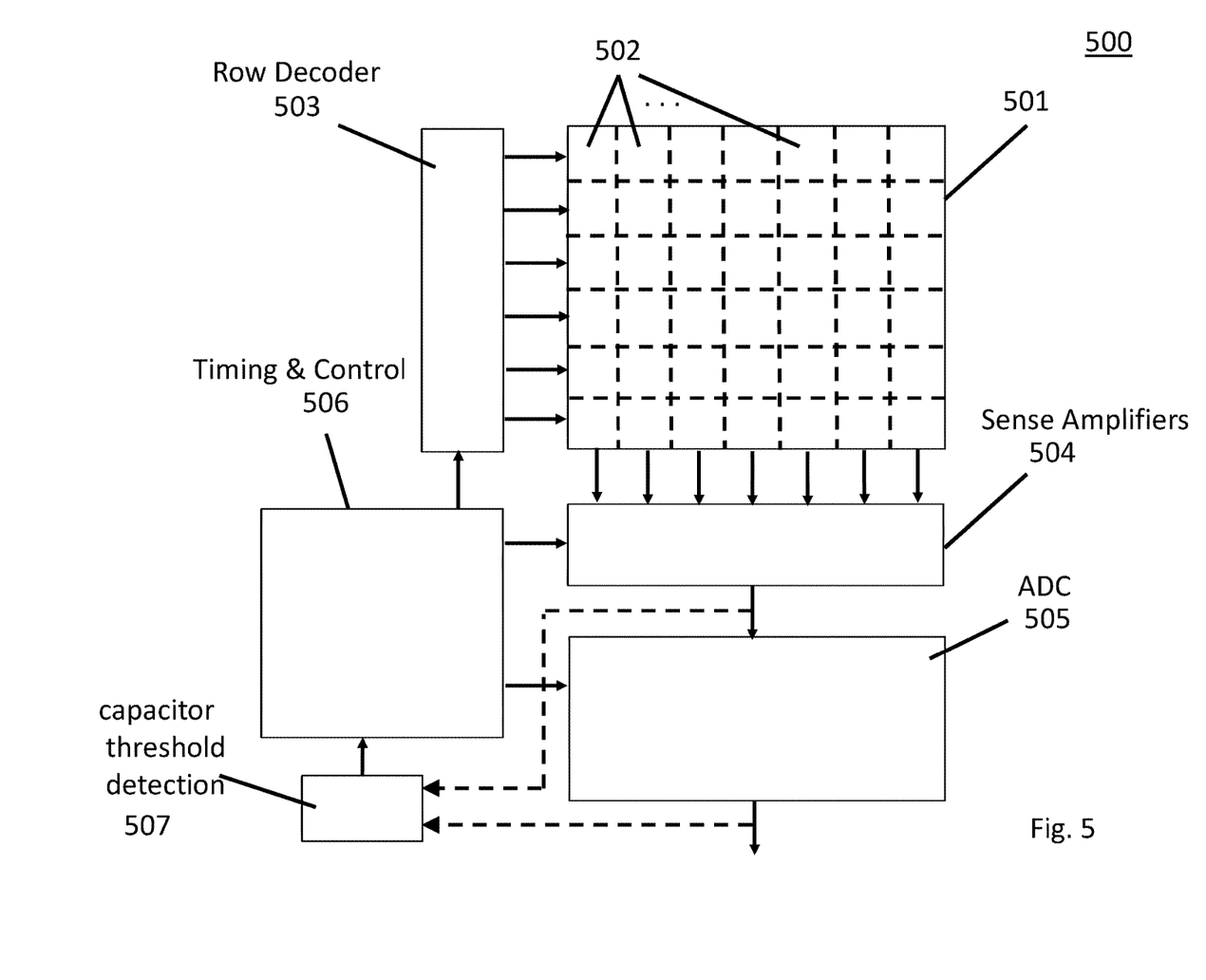
FIG. 5 shows an image sensor having an extended upper limit on its dynamic range.

FIG. 5 shows an embodiment of an image sensor 500 having an extended upper limit on the dynamic range of its pixels owing to its ability to perform sneak readouts of pixel storage capacitor voltage levels.

As observed in FIG. 5, the image sensor 500 includes a pixel array 501 having constituent pixel cells 502. Coupled to the pixel array 501 is a row decoder 502 having outputs that couple to rows of pixel cells 502. Sense amplifiers 504 are also coupled to the pixel array cell 502 signal outputs. The image sensor 500 also includes analog-to-digital circuitry 505 coupled downstream from the sense amplifiers 503. The image sensor 500 also includes timing and control circuitry 506 that is responsible for generating clock and control signals that dictate the operation of the image sensor 500 (for ease of drawing FIG. 5 only shows coupling to row decoder 503 but other couplings to the array are understood). The pixel cells 502 may be visible light (e.g., RGB) pixel cells, Z pixels or a combination of the two.

The pixel cells 502 includes respective storage capacitors to store charge that has been transferred from their respective photodiodes. The timing and control circuitry 506 turns the transfer gate of the pixel cells 502 on and off multiple times over the course of the capturing of a single image which, in turn, causes charge to be transferred from the photodiodes to their storage capacitors multiple times over the course of the single image capture. In an embodiment, the timing and control circuitry 506 activates the row select transistor of the pixel cells multiple times over the course of the single image capture so that it can regularly sneak readouts of the storage capacitor voltage levels during the image capture sequence.

Circuitry 507 compares the capacitor voltage levels against a threshold that indicates storage capacitor saturation. If any such comparison indicates that a storage capacitor is saturating, circuitry 507 sends a signal to the timing and control circuitry 506 to, e.g., deactivate further charge transfers by the cell having the saturated storage capacitor. In one embodiment just the cell is deactivated. In another embodiment, the cell's entire row is deactivated. Circuitry 507 or other circuitry within the image sensor may perform other calculations or provide further information associated with threshold detection (such as, in the case of a time-of-flight measurement, generating a signal that articulates at "which" sneak readout saturation occurred in the case of a time-of-flight measurement, or, in the case of visible light detection, extrapolating the received intensity).

Figure 6:
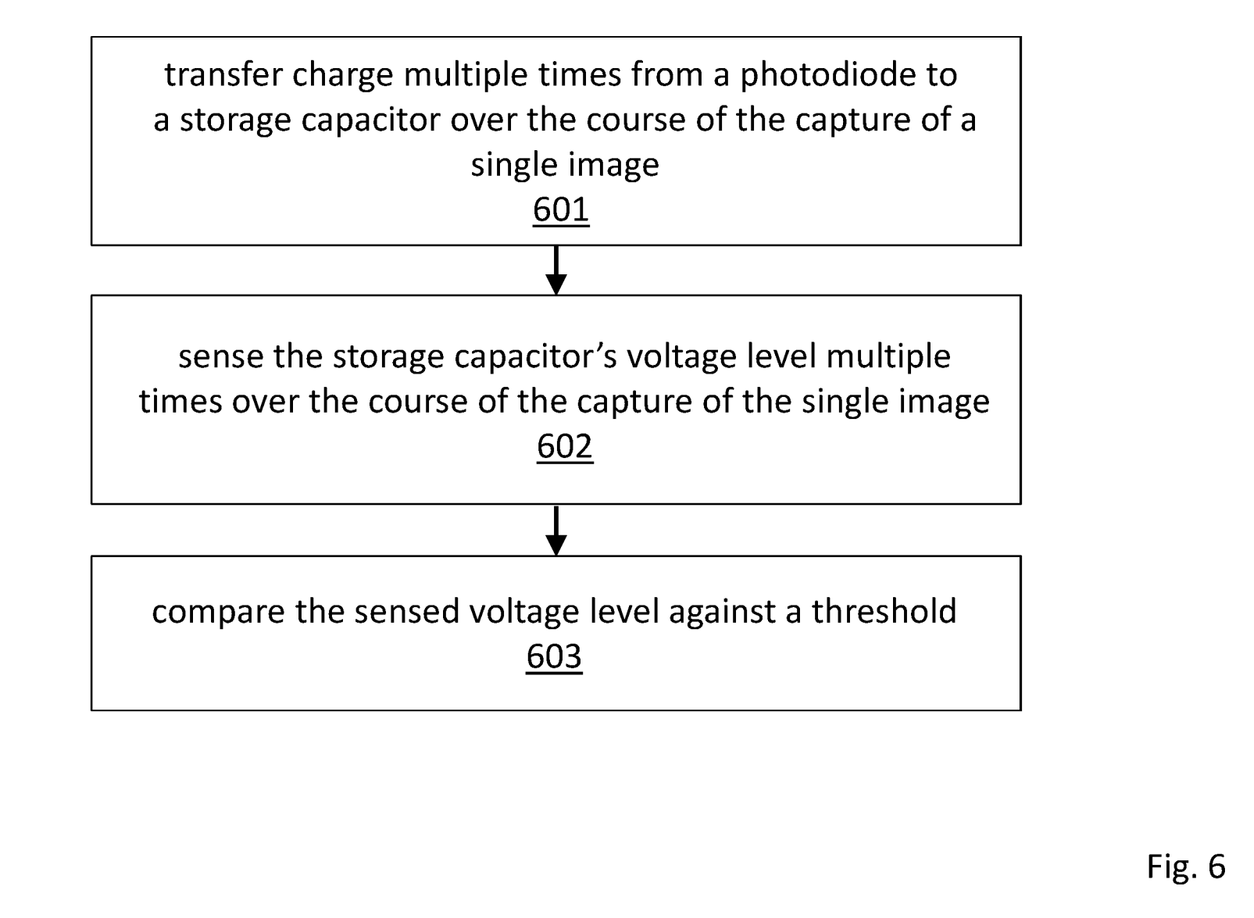
FIG. 6 shows a methodology performed the image sensor of FIG. 5.

FIG. 6 shows a methodology performed by the image sensor of FIG. 5. As observed in FIG. 6, the method includes transferring charge multiple times from a photodiode to a storage capacitor over the course of the capture of a single image 601. The method also includes sensing the storage capacitor's voltage level multiple times over the course of the capture of the single image 602. The method also includes comparing the sensed voltage level against a threshold 603.

Figure 7:
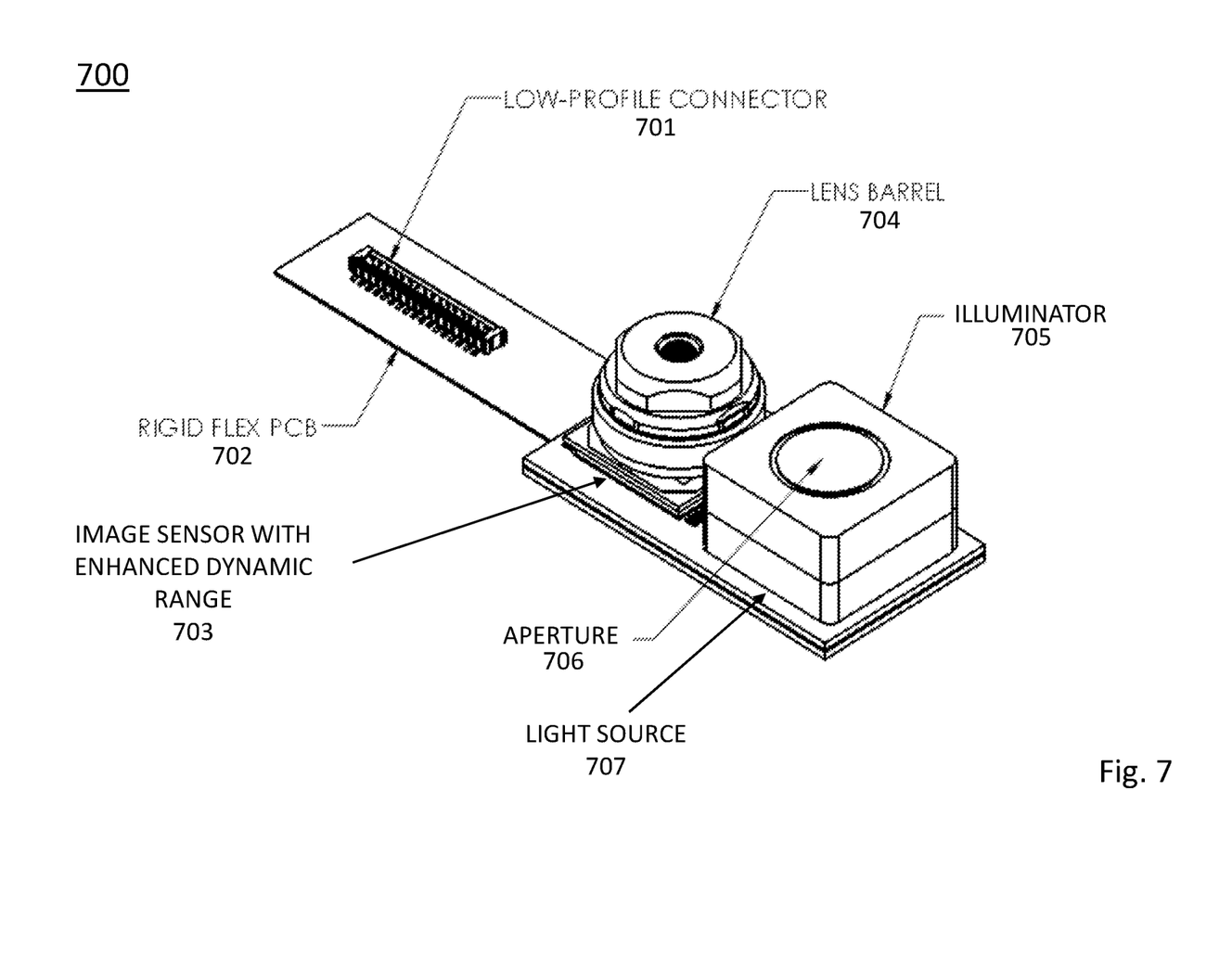
FIG. 7 shows a 2D/3D camera with an image sensor having an extended upper limit on its dynamic range.

FIG. 7 shows an integrated traditional camera and time-of-flight imaging system 700. The system 700 has a connector 701 for making electrical contact, e.g., with a larger system/mother board, such as the system/mother board of a laptop computer, tablet computer or smartphone. Depending on layout and implementation, the connector 701 may connect to a flex cable that, e.g., makes actual connection to the system/mother board, or, the connector 701 may make contact to the system/mother board directly.

The connector 701 is affixed to a planar board 702 that may be implemented as a multi-layered structure of alternating conductive and insulating layers where the conductive layers are patterned to form electronic traces that support the internal electrical connections of the system 700. Through the connector 701 commands are received from the larger host system such as configuration commands that write/read configuration information to/from configuration registers within the camera system 700.

An RGBZ image sensor 703 is mounted to the planar board 702 beneath a receiving lens 702. The RGBZ image sensor includes a pixel array having different kinds of pixel cells, some of which are sensitive to visible light (specifically, a subset of R pixels that are sensitive to visible red light, a subset of G pixels that are sensitive to visible green light and a subset of B pixels that are sensitive to blue light) and others of which are sensitive to IR light. The RGB pixel cells are used to support traditional "2D" visible image capture (traditional picture taking) functions. The IR sensitive pixel cells are used to support 3D depth profile imaging using time-of-flight techniques.

Although a basic embodiment includes RGB pixels for the visible image capture, other embodiments may use different colored pixel schemes (e.g., Cyan, Magenta and Yellow). The image sensor 703 may also include ADC circuitry for digitizing the signals from the image sensor and timing and control circuitry for generating clocking and control signals for the pixel array and the ADC circuitry. The image sensor 703 may also have an extended upper limit on its dynamic range by including features discussed above with respect to FIGS. 4 through 6.

The planar board 702 may include signal traces to carry digital information provided by the ADC circuitry to the connector 701 for processing by a higher end component of the host computing system, such as an image signal processing pipeline (e.g., that is integrated on an applications processor).

A camera lens module 704 is integrated above the RGBZ image sensor 703. The camera lens module 704 contains a system of one or more lenses to focus received light to the image sensor 703. As the camera lens module's reception of visible light may interfere with the reception of IR light by the image sensor's time-of-flight pixel cells, and, contrawise, as the camera module's reception of IR light may interfere with the reception of visible light by the image sensor's RGB pixel cells, either or both of the image sensor's pixel array and lens module 703 may contain a system of filters arranged to substantially block IR light that is to be received by RGB pixel cells, and, substantially block visible light that is to be received by time-of-flight pixel cells.

An illuminator 705 composed of a light source array 707 beneath an aperture 706 is also mounted on the planar board 701. The light source array 707 may be implemented on a semiconductor chip that is mounted to the planar board 701.

The light source driver that is integrated in the same package 703 with the RGBZ image sensor is coupled to the light source array to cause it to emit light with a particular intensity and modulated waveform.

In an embodiment, the integrated system 700 of FIG. 7 supports three modes of operation: 1) 2D mode; 3) 3D mode; and, 3) 2D/3D mode. In the case of 2D mode, the system behaves as a traditional camera. As such, illuminator 705 is disabled and the image sensor is used to receive visible images through its RGB pixel cells. In the case of 3D mode, the system is capturing time-of-flight depth information of an object in the field of view of the illuminator 705. As such, the illuminator 705 is enabled and emitting IR light (e.g., in an on-off-on-off . . . sequence) onto the object. The IR light is reflected from the object, received through the camera lens module 704 and sensed by the image sensor's time-of-flight pixels. In the case of 2D/3D mode, both the 2D and 3D modes described above are concurrently active.

Figure 8:
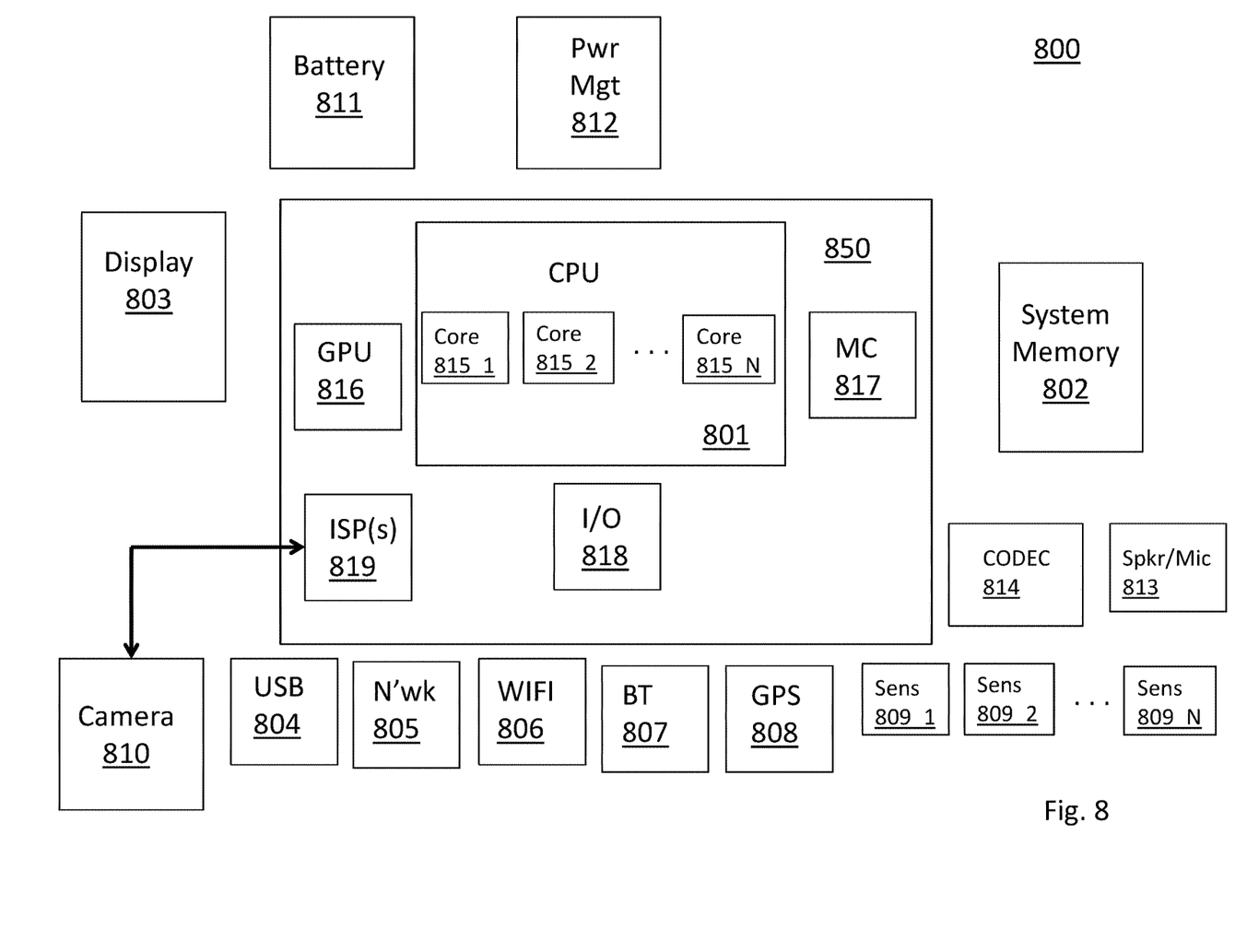
FIG. 8 shows a computing system.

FIG. 8 shows a depiction of an exemplary computing system 800 such as a personal computing system (e.g., desktop or laptop) or a mobile or handheld computing system such as a tablet device or smartphone. As observed in FIG. 8, the basic computing system may include a central processing unit 801 (which may include, e.g., a plurality of general purpose processing cores) and a main memory controller 817 disposed on an applications processor or multi-core processor 850, system memory 802, a display 803 (e.g., touchscreen, flat-panel), a local wired point-to-point link (e.g., USB) interface 804, various network I/O functions 805 (such as an Ethernet interface and/or cellular modem subsystem), a wireless local area network (e.g., WiFi) interface 806, a wireless point-to-point link (e.g., Bluetooth) interface 807 and a Global Positioning System interface 808, various sensors 809_1 through 809_N, one or more cameras 810, a battery 811, a power management control unit 812, a speaker and microphone 813 and an audio coder/decoder 814.

An applications processor or multi-core processor 850 may include one or more general purpose processing cores 815 within its CPU 401, one or more graphical processing units 816, a main memory controller 817, an I/O control function 818 and one or more image signal processor pipelines 819. The general purpose processing cores 815 typically execute the operating system and application software of the computing system. The graphics processing units 816 typically execute graphics intensive functions to, e.g., generate graphics information that is presented on the display 803. The memory control function 817 interfaces with the system memory 802. The image signal processing pipelines 819 receive image information from the camera and process the raw image information for downstream uses. The power management control unit 812 generally controls the power consumption of the system 800.

Each of the touchscreen display 803, the communication interfaces 804 -807, the GPS interface 808, the sensors 809, the camera 810, and the speaker/microphone codec 813, 814 all can be viewed as various forms of I/O (input and/or output) relative to the overall computing system including, where appropriate, an integrated peripheral device as well (e.g., the one or more cameras 810). Depending on implementation, various ones of these I/O components may be integrated on the applications processor/multi-core processor 850 or may be located off the die or outside the package of the applications processor/multi-core processor 850.

In an embodiment one or more cameras 810 includes an RGBZ image sensor having an extended upper limit on its dynamic range by having features discussed above with respect to FIGS. 4 through 6. Application software, operating system software, device driver software and/or firmware executing on a general purpose CPU core (or other functional block having an instruction execution pipeline to execute program code) of an applications processor or other processor may direct commands to and receive image data from the camera system.

In the case of commands, the commands may include entrance into or exit from any of the 2D, 3D or 2D/3D system states discussed above.

Embodiments of the invention may include various processes as set forth above. The processes may be embodied in machine-executable instructions. The instructions can be used to cause a general-purpose or special-purpose processor to perform certain processes. Alternatively, these processes may be performed by specific hardware components that contain hardwired logic for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
   an image sensor comprising:
      timing and control circuitry to generate signals to cause multiple transfers of charge from a photo-diode to a storage capacitor within a pixel cell during an image capture sequence;
      threshold circuitry to track said storage capacitor's voltage over the course of said multiple transfers and recognize when said storage capacitor's voltage reaches a threshold, wherein said timing and control circuitry is coupled to a transfer gate of said pixel cell to control said transfers of charge through said transfer gate;
      circuitry to extrapolate an optical intensity received by said photo-diode based on when said storage capacitor's voltage reached said threshold; and
      circuitry to perform a time-of-flight calculation that accounts for said storage capacitor's voltage reaching said threshold.

2. The apparatus of claim 1 wherein said pixel cell is a visible light pixel cell.

3. The apparatus of claim 1 wherein said pixel cell is a time-of-flight pixel cell.

4. The apparatus of claim 1 wherein said pixel cell includes visible light pixel circuitry and time-of-flight pixel circuitry.

5. The apparatus of claim 1 wherein said signals cause interleaved exposures and charge transfers during said exposure time.

6. The apparatus of claim 5 wherein said threshold circuitry is to perform a respective sneak read of said capacitor's voltage during each of a plurality of said exposures.

7. The apparatus of claim 1 wherein said threshold circuitry has an input coupled to an output of a sense amplifier.

8. The apparatus of claim 1 wherein said threshold circuitry has an input coupled to an output of an analog-to-digital converter circuit.

9. The apparatus of claim 1 wherein said timing and control circuitry is to shut down said pixel cell's row in response to said storage capacitor's voltage reaching said threshold.

10. A method, comprising:
generating image sensor signals to cause multiple transfers of charge from a photo-diode to a storage capacitor within a pixel cell during an image capture sequence;
tracking said storage capacitor's voltage over the course of said multiple transfers;
recognizing when said storage capacitor's voltage reaches a threshold;
extrapolating an optical intensity received by said photo-diode based on when said storage capacitor's voltage reached said threshold; and
performing a time-of-flight calculation that accounts for said storage capacitor's voltage reaching said threshold.

11. A computing system, comprising:
a plurality of general purpose processors;
a system memory;
a memory controller coupled between the plurality of general purpose processors and the system memory; and,
an image sensor comprising:
 a) timing and control circuitry to generate signals to cause multiple transfers of charge from a photo-diode to a storage capacitor within a pixel cell during an image capture sequence;
 b) threshold circuitry to track said storage capacitor's voltage over the course of said multiple transfers and recognize when said storage capacitor's voltage reaches a threshold, wherein said timing and control circuitry is coupled to a transfer gate of said pixel cell to control said transfers of charge through said transfer gate;
 c) circuitry to extrapolate an optical intensity received by said photo-diode based on when said storage capacitor's voltage reached said threshold; and
 d) circuitry to perform a time-of-flight calculation that accounts for said storage capacitor's voltage reaching said threshold.

12. The computing system of claim 11 wherein said pixel cell is a visible light pixel cell.

13. The computing system of claim 11 wherein said pixel cell is a time-of-flight pixel cell.

14. The computing system of claim 11 wherein said pixel cell includes visible light pixel circuitry and time-of-flight pixel circuitry.

15. The computing system of claim 11 wherein said signals cause interleaved exposures and charge transfers during said exposure time.

16. The computing system of claim 15 wherein said threshold circuitry is to perform a respective sneak read of said capacitor's voltage during each of a plurality of said exposures.

17. The computing system of claim 11 wherein said threshold circuitry has an input coupled to one of :
an output of a sense amplifier;
an output of an analog-to-digital converter circuit.

\* \* \* \* \*